May 10, 1955 R. J. TRAINOR 2,707,981
CITRUS FRUIT JUICE EXTRACTOR
Filed June 16, 1950 4 Sheets-Sheet 1

ROBERT J. TRAINOR,
INVENTOR.

BY

Hazard & Miller
ATTORNEYS

May 10, 1955 R. J. TRAINOR 2,707,981
CITRUS FRUIT JUICE EXTRACTOR
Filed June 16, 1950 4 Sheets-Sheet 2
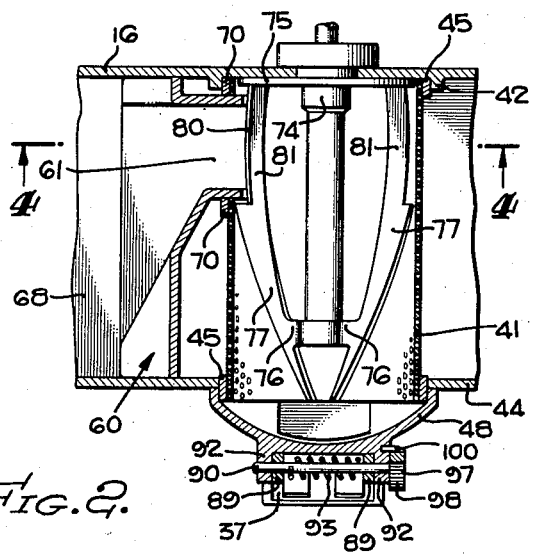
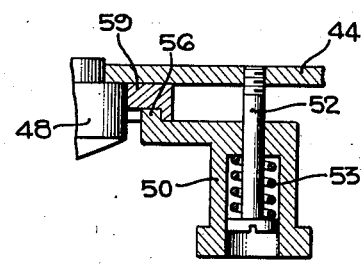
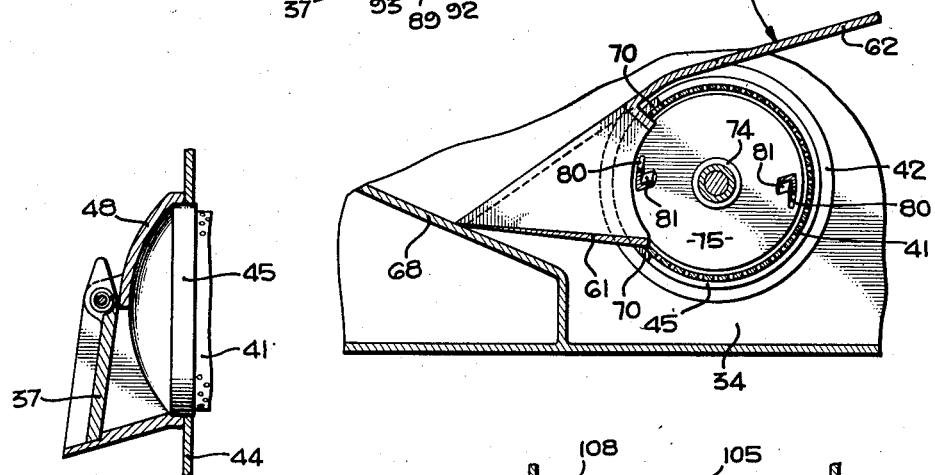
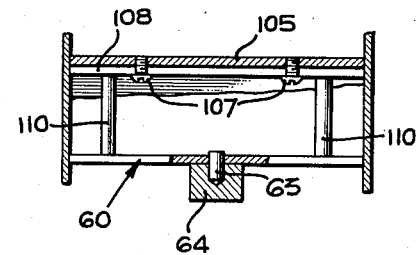
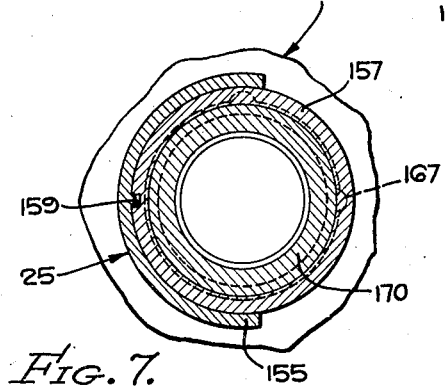
ROBERT J. TRAINOR,
INVENTOR.
BY Hazard & Miller
ATTORNEYS May 10, 1955 R. J. TRAINOR 2,707,981
CITRUS FRUIT JUICE EXTRACTOR
Filed June 16, 1950 4 Sheets-Sheet 3

ROBERT J. TRAINOR,
INVENTOR.

BY Hazard & Miller
ATTORNEYS

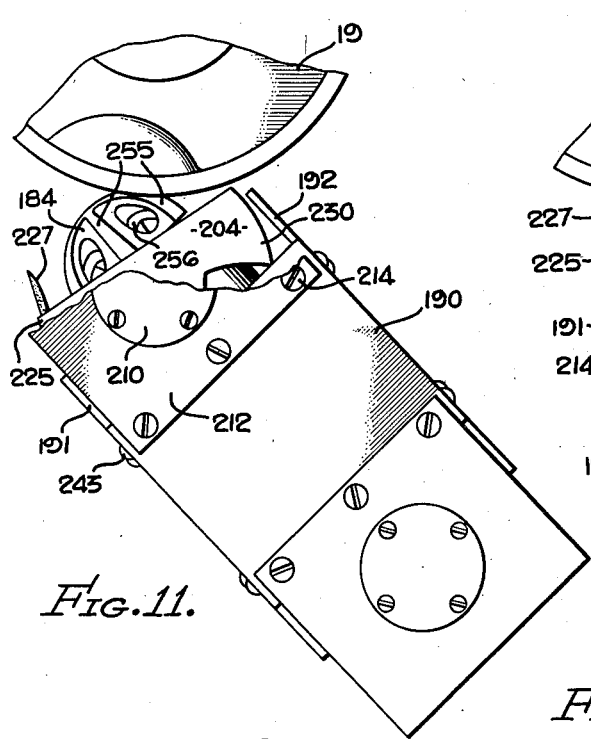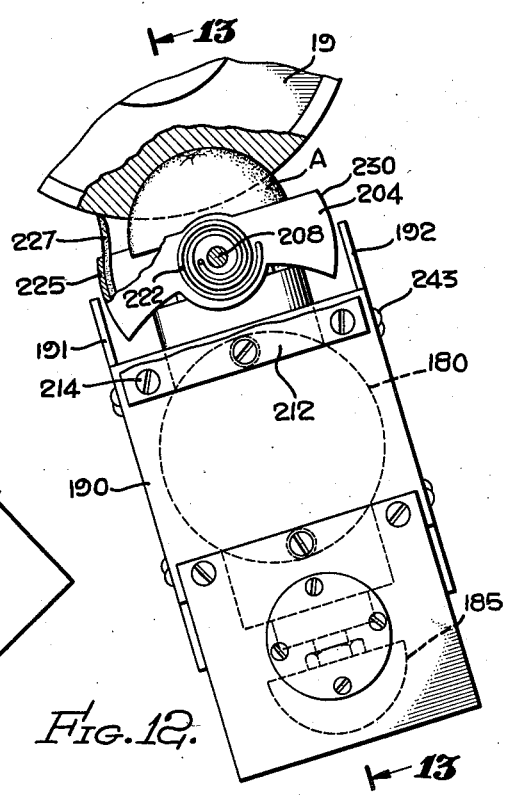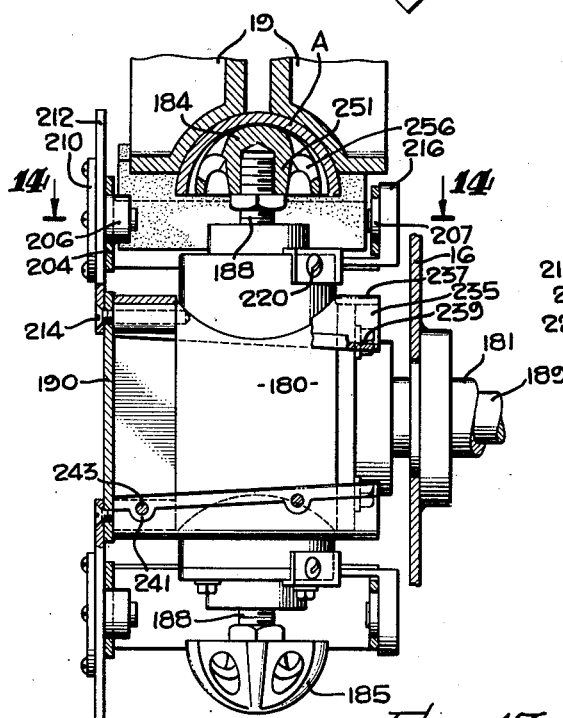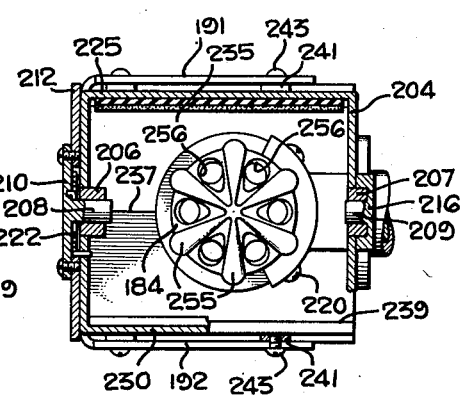

United States Patent Office 2,707,981
Patented May 10, 1955

2,707,981

CITRUS FRUIT JUICE EXTRACTOR

Robert J. Trainor, El Monte, Calif., assignor to Earle E. Crowe, El Monte, Calif.

Application June 16, 1950, Serial No. 168,434

2 Claims. (Cl. 146—3)

This invention relates to a fruit juice extractor wherein citrus fruit are fed to a machine and automatically split into halves, reamed to obtain the juice which is discharged from the machine through one outlet, pulp which is discharged through another outlet and the peels which are discharged from still another outlet, and to improvements in this type of apparatus. The present application may be considered a continuation-in-part of my prior application for citrus fruit juice extractor filed December 7, 1948, Serial No. 63,887, now Patent No. 2,602,479 granted July 8, 1952.

A main object of the present invention is to provide improvements in the finisher of a machine as above described, the finisher also being called the juice and pulp separator. These improvements include a unitary cover plate and pulp and juice hopper which is arranged to have the hopper fit within a juice screen to prevent rotation of the screen and also a novel finishing blade arrangement and a spring pressed or loaded pulp gate which is so designed that the wetness of the pulp may be regulated.

Another object of the present invention is to provide in a machine as above set out a novel reamer unit which is so designed as to confine the splatter caused by engagement of the reamer with fruit halves to thereby increase the output of the machine by preventing the waste of juice which would result from the juice being splattered on the different parts of the machine and onto the peels which fall into an outlet hopper in the machine. This novel construction also confines the splatter so that in those types of machines having a front viewing window, this window is kept relatively clean allowing an easier visual inspection of the operating parts on the opposite side of the window.

Another object of the present invention is to provide a novel comminuter to be used with a machine as above described.

Another object of the present invention is to provide a novel type of reamer head which allows a freer flow of juices than heretofore possible.

Another object of the present invention is to provide an improved fruit inlet assembly having a removable centering sleeve or member to enable the centering sleeve or member to be replaced so that different sizes of fruit can be properly centered with reference to the mechanism which is aligned with the fruit inlet.

Another object of the present invention is to provide in a machine as above set out a novel baffle plate construction which has the advantage of not collecting pulp but on the contrary, serves to direct the pulp and juice in a predetermined direction as it is desirable.

Another object of the present invention is to provide various improvements in a machine as above described, and also to provide various units or parts which can be used with such a machine.

Another object of the present invention is to provide a machine and various units to be used in the machine constructed so that nuts and bolts and other types of fastening means around and in which juice can collect will be eliminated thereby resulting in a more sanitary device.

Another object of the present invention is to provide in a machine as above described various units which are easily removable to allow for proper cleaning of the machine and provide a more sanitary machine.

With the foregoing and other objects in view, which will be made manifest in the following detailed description and specifically pointed out in the appended claims, reference is had to the accompanying drawings for an illustrative embodiment of the invention, wherein:

Fig. 2 is a fragmentary sectional view in plan along lines 2—2 of Fig. 1 showing portions of the finisher or pulp and juice separator;

Fig. 3 is a fragmentary sectional view in elevation along lines 3—3 of Fig. 1, showing the pulp gate construction;

Fig. 4 is a fragmentary sectional view in elevation along lines 4—4 of Fig. 2;

Fig. 5 is a fragmentary sectional view along lines 5—5 of Fig. 1, showing the manner of mounting the pulp gate assembly;

Fig. 6 is a fragmentary sectional view along lines 6—6 of Fig. 1, showing the manner of engagement of baffle plates and the manner of mounting a cover plate;

Fig. 7 is a sectional view along lines 7—7 of Fig. 1, showing a part of the construction of the fruit inlet assembly;

Fig. 11 is a view in elevation of a reamer assembly with parts of the device broken away;

Fig. 12 is a view in elevation similar to Fig. 11, with the assembly being rotated to an advanced position and with other parts of the device broken away;

Fig. 13 is a sectional view along lines 13—13 of Fig. 12; and

Fig. 14 is a sectional view along lines 14—14 of Fig. 13.

Figure 1:
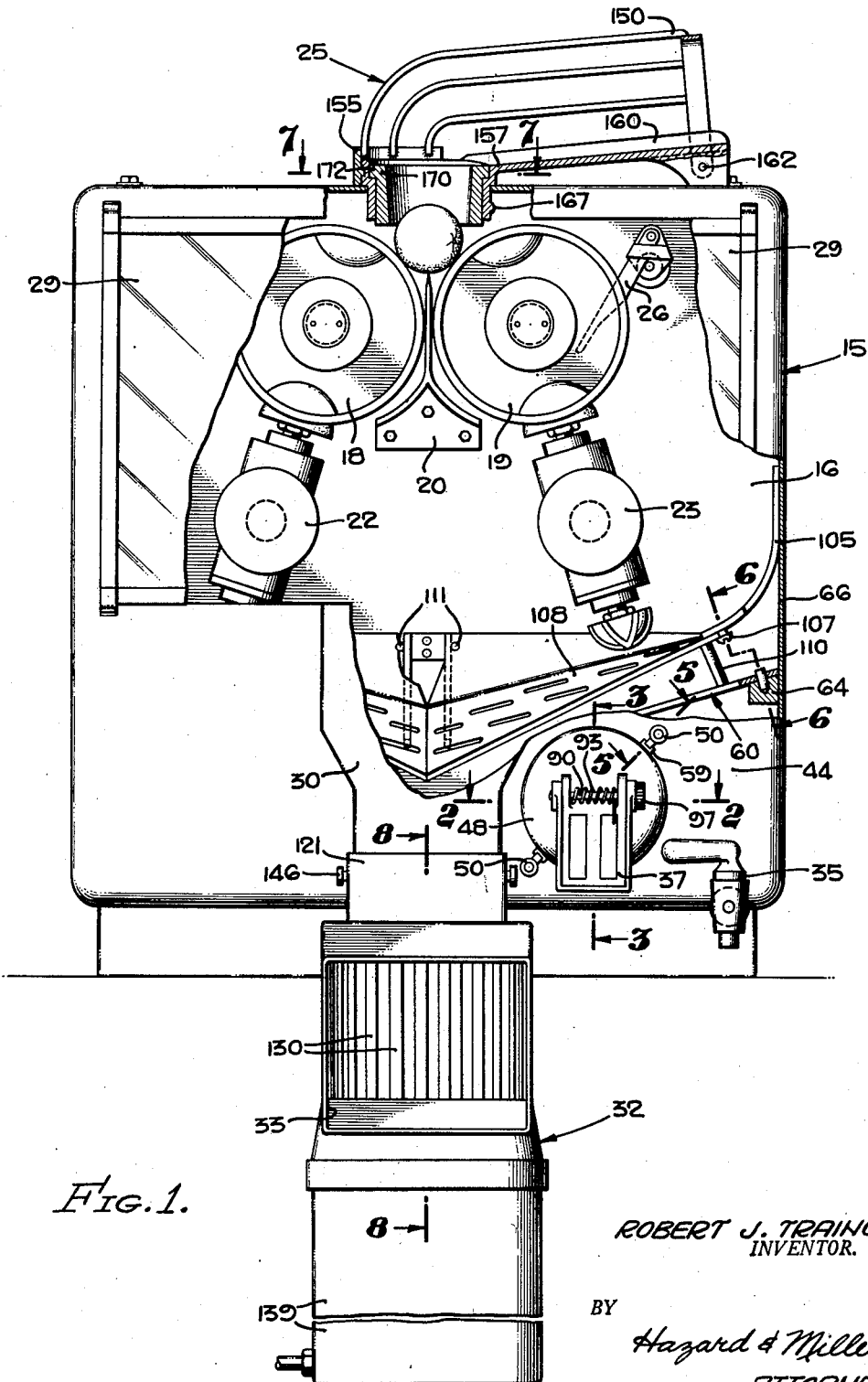
Figure 1 is a front view in elevation of a machine embodying the concepts of the present invention.

Referring to the accompanying drawings wherein similar reference characters designate similar parts throughout, the fruit extractor apparatus includes a housing 15 having a housing-dividing partition or wall 16 therein and there are complementary cup-carrying members 18 and 19 rotatably supported from the wall 16. There is a knife arrangement 20 secured to the wall 16 and there are reamer assemblies 22 and 23 rotatably mounted from the wall 16 and driven in synchronism with the complementary cup-carrying members 18 and 19 so that the reamers carried by the reamer assemblies properly enter the cups in the cup-carrying members to ream the fruit therein. The fruit enters through a fruit inlet assembly 25 and is divided by the knife 20, opposed halves being retained within the complementary cup-providing members. There are peel ejector assemblies 26, one of which is shown, and there is a viewing window 29 on the front of the housing to permit viewing of the apparatus on the front of the wall 16. The above general construction is fully described in my copending application above mentioned, and therefore need not be elaborated on.

The fruit halves, after being reamed, are deflected and directed by suitable baffles to be described into an outlet hopper 30 which communicates with the upper portion of the comminuter generally indicated at 32 which comminutes the peels and discharges them through an outlet 33, it being contemplated that some sort of receptacle or bag will be provided on outlet 33 to receive the comminuted material. The pulp and juice will flow through and around the peel baffles and be directed toward a finisher or pulp and juice separator, generally shown in Figs. 2 to 5, and the juice will be collected in the space 34 shown in Fig. 4, and can be removed from the machine by a suitable spigot 35. The pulp is forced through a spring loaded pulp gate 37, compare Figs. 1 and 2, in a manner to be described. The above general description relates to various units and assemblies of the machine, and in a general way sets out their functions. One of the most important parts of the machine of the present invention is the finisher or pulp and juice separator and the finisher which comprises a cylindrical screen 41 fitting within an annular boss 42 on wall or partition 16, see Fig. 2, and has the outer end thereof fitting within and being slidably received by the front wall 44 of the housing 15. The opposite ends of the screen 41 are provided with bands 45 to reenforce the screen. The screen is retained within the housing by a cap 48 which is secured to the front wall 44 of the housing as shown in Fig. 5, by clamp elements 50 resiliently retained on the front wall 44 by headed pins 52 and springs 53. It is obvious that the clamps 50 can be moved outwardly allowing the clamping ends 56 of the clamps 50 to be moved off the recessed lugs 59 on the cap, compare Figs. 1 and 5, thereby allowing easy removal of the cap 48 and therefore the screen 41.

Since the screen 41 is slidably received by the annular boss 42 and the front 44 of the housing, means must be provided for preventing rotation of the screen during operation of the finisher. A novel part of the invention comprises a unitary member 60 which provides a pulp and juice hopper 61 and also a cover plate or juice deflector 62, see Fig. 4. Cover plate or juice deflector 62 is provided with a pin 63 received in a recessed lug 64 provided on the side 66 of the housing 15, compare Figs. 1 and 6. The lower end of unitary member 60 rests on a partition 68 which may be integrally cast with the housing 15 or otherwise suitably provided, partition 68 separating the peel compartment from the juice and pulp compartment.

Screen 41 is provided with a reenforcing member 70, see Fig. 2, which reenforcing member surrounds a hopper receiving aperture in the screen and the hopper 61 fits within the aperture or opening, as shown in Fig. 4, and not only directs the pulp and juice into the screen 41 but prevents rotation of the screen 41.

There is a finisher blade assembly best shown in Figs. 2 and 4 which comprises a spindle 74 having a spindle seal shielding plate 75 and spokes 76 secured thereto or formed integrally therewith for supporting helically formed blades 77 which are secured at one set of ends to plate 75 and adjacent their other ends to spokes 76. Spindle 74 is suitably driven in a manner best shown in my copending application and therefore need not be shown here. In my copending application there was provided helically arranged blades 77 but an improvement in the present invention comprises providing circumferentially arranged portions 80 extending from radial portions 81 of the blades. This construction ensures that the pulp which has a tendency to collect in the hopper 61 will be removed from the outlet of the hopper and into the screen where it is forced by the helical blades 77 toward the pulp gate 37. As shown in Fig. 2, the circumferentially arranged portions 80 are located inwardly of the outermost portions of the radial portions 81 of the blade so as to avoid interference with the hopper 61.

The pulp gate 37 previously referred to in general terms is pivotally mounted by ears 89 on a pin 90, see Fig. 2, which pin is slidably received by ears 92 provided by cap 48. There is a coil spring 93 about pin 90 and secured at one end to the pin and at the other end to the gate 37 and spring 93 is for the purpose of urging the gate to close the outlets in the cap 48. A head 97 is provided on one end of pin 90 and is grooved at 98 thereabouts to enable the head to selectively engage a fixed pin 100 provided on cap 48. The head 97 is merely drawn to the right as the parts are depicted in Fig. 2 sliding the pin 90 to the right and somewhat compressing spring 93 and the head is merely turned thereby increasing the tension on the spring 93 and again engaged with the pin 100 to provide a different amount of pressure of the pulp gate 47 against the cap 48. By this novel arrangement the wetness of the pulp issuing from the screen 41 can be controlled and with different types of fruit it is desired to vary the amount of wetness which this novel arrangement allows. It will be appreciated that there are no nuts or bolts or any tools required for adjusting the spring tension on the gate 37 but the tension may be adjusted by merely manipulating the head 97.

Another part of the present invention includes a curved imperforate baffle plate 105, see Figs. 1 and 6, which has lug-forming screws 107 thereon which engage the upper end of a perforated peel baffle plate 108. By this arrangement, the curved imperforate baffle plate 105 has the upper end thereof resting against the side wall 66 of housing 15 and the lower end firmly retained by the lugs 107 on the perforated peel baffle plate 108. The perforated peel baffle plate 108 has feet 110 resting on unitary member 60 and is supported at its inner end by a pin 111 protruding from the wall or partition 16 and fitting within an aperture provided in perforated peel baffle plate 108. It will be appreciated that although the baffle plates 105 and 108 have been described as being singular, there are complementary baffle plates on the opposite side of the apparatus. By the above novel construction of the peel baffle plates, ready removal and cleaning of these baffle plates is possible, and since the baffle plates are not secured by nuts and bolts and the like which have a tendency to collect pulp, juice and the like a more sanitary device is provided. In my prior application there were spaced bars instead of an imperforate plate 105, but I have discovered that there is a tendency for these spaced bars to collect pulp and be blocked by pulp, making cleaning of the bars necessary. By providing an imperforate plate this blocking and clogging is eliminated. A more serious objection resulting from this blocking or clogging was the slowdown of the peels and since it is obvious that a greater output can be realized by operating the machine at an optimum speed the imperforate baffle plates of the present invention serve to quickly deflect and not impede the peels so that maximum operating conditions are obtained.

Figure 8:
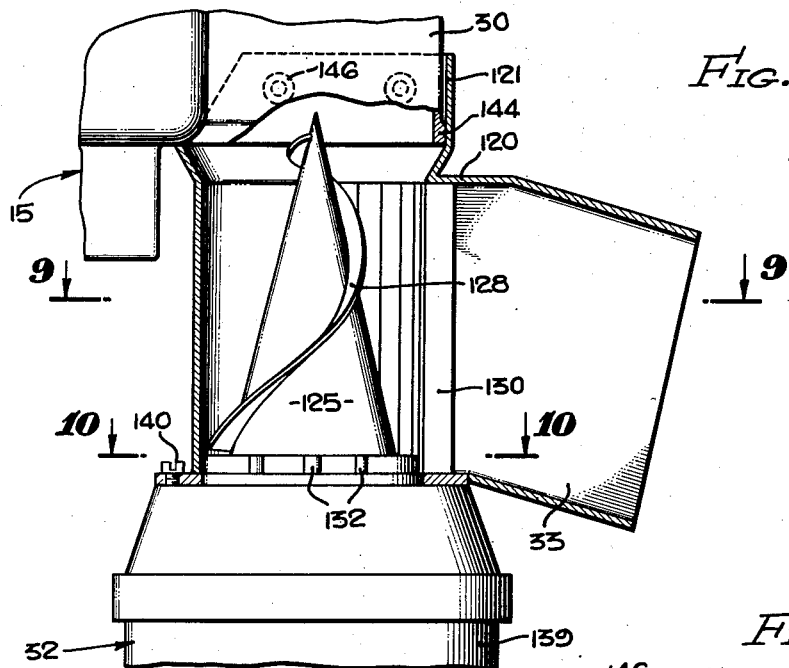
Fig. 8 is a sectional view in plan along lines 8—8 of Fig. 1 showing the upper portion of the comminuter and its connection to the rest of the machine.
Figure 9:
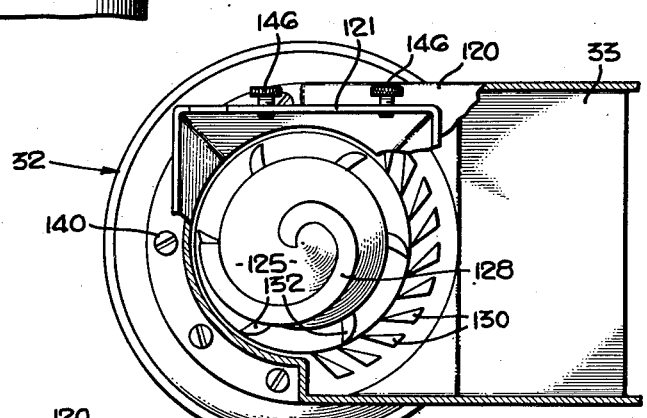
Fig. 9 is a sectional view in plan along lines 9—9 of Fig. 8.

The peel baffle plates 105 and 108 deflect the peels ejected by ejectors 26 through the peel outlet 30 and into a comminuter 32. The comminuter 32 has an upper housing 120 providing a somewhat flared mouth 121 and an outlet 33 for the comminuted material. Within the housing 120 there is rotatably supported a cone-shaped element 125 which has secured thereto a spirally arranged feeding rib 128 as best shown in Figs. 8 and 9. A plurality of fixed blades 130 are secured to housing 120 and cooperate with the spiral feeding rib 128 to cut up and thoroughly comminute the peels.

There are radially arranged spiral ribs 132 provided on the bottom of cone element 125, said ribs being secured to a hub 134 which, in turn, is secured to the driving shaft 136 for the cone 125. There is a suitable motor, not shown, connected to driving shaft 136 for driving the cone and the spiral feeding rib 128. Spiral ribs 132 serve to deflect and force fluids away from the shaft 136 and thereby rendering sealing of the shaft easier and more practical. The outer ends of the ribs 132 extend beyond the cone element 125 as can be seen in Fig. 9, and serve to force any particles reaching the level of the ribs 132 against the knives 130 to thoroughly comminute the particles.

Figure 10:
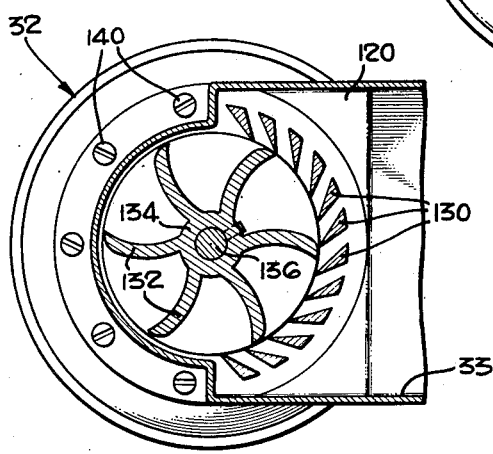
Fig. 10 is a sectional view in plan along lines 10—10 of Fig. 8.

The housing 120 may be detachably secured to the motor housing 139 of the comminuter by screws 140, see Fig. 10. The comminuter may be detachably retained on the outlet hopper 30 of the machine by providing a rib or enlarged portion 144 around the lower end of the hopper 30 and by providing thumb screws 146 on the mouth 121 of the housing 120.

Another part of the present invention comprises the fruit inlet assembly 25, generally referred to hereinbefore. This fruit inlet assembly includes an inclined chute 150 having the outlet end thereof provided with a semi-circular reenforcing member 155 which detachably engages a supporting member 157, said supporting member having a pin and lug connection 159 as best shown in Fig. 7. The supporting member 157 has a lateral extension 160 to which the inlet end of the chute 150 is secured by a suitable nut and bolt connection 162. The supporting member 157 is provided with lugs 167 which fit within notches in the top of the housing 15 to provide a bayonet joint between the member 157 and the top of the housing. It is obvious in this type of connection that the member 157 needs to be rotated from the position shown in Fig. 1 to the position where the notches and lugs 167 align with one another. The supporting member can thereafter be removed.

A fruit-centering bushing 170 having a tapered bore fits within member 157 by means of a shoulder 172, and this centering bushing 170 is replaceable so that different sizes of fruit will be properly centered, it being obvious for the correct operation of the machine the fruit must be centered with relation to the knife arrangement 20 and the complementary cup-carrying members 18 and 19. Whereas in the other parts of the machine it has been desirable to eliminate nuts and bolts such as 162, it is not desirable to eliminate the nut and bolt connection 162 for the chute 150 because the chute not only serves as a guide for the fruit but prevents the operator and other persons from accidentally being injured by inserting their hands unintentionally or intentionally through the centering bushing 170. If the cage is constructed to be very easily removed from the supporting member 157 there is some danger that this construction will make it easier for the operator or other persons to be injured, whereas, if a nut and bolt connection is provided the operator will realize that whereas the other units can be readily removed and this unit is removed only with difficulty that the operator is warned by this construcion. The bushing 170 can be replaced by removing chute 150 from the supporting member 157 and another size bushing replaced. The supporting member 167 itself can serve the function of a fruit-centering sleeve for larger fruit when the centering bushing 170 is completely removed.

Another part of the present invention concerns the reamer assembly shown in Figs. 1 and 11 through 14. There is a reamer holder or carrier 180 supported on a sleeve 181 from wall 16 and the reamers 184 and 185 are driven by driven shafts 188 by a driving shaft 189 through gearing, not shown. The above general construction is shown in my copending application and therefore need not be described in detail. I have observed that the splatter of juices caused by engagement of the reamers with fruit halves has coated the fruit peels, the various parts of the machine, and the window of the machine. This splattering above referred to has several disadvantages including the wasting of orange juice since the peels are merely conducted away and dispensed with. Also, viewing through the window 29 is rendered more difficult when the window is splattered, and therefore, it is an object of the present invention to provide means for confining the splatter so that fruit peels are not coated and the various parts of the machine including the window 29, are not coated or splattered.

The means for accomplishing this purpose comprised a U-shaped frame member 190, compare Figs. 11 and 14, which has upstanding side portions 191 and 192 on opposite ends thereof which serve as side guards or deflectors for the reamers. Since the construction around each of the reamer heads 184 and 185 is the same only the construction around reamer head 184 will be described in detail. It is obvious from viewing Figs. 11 and 12 that the upstanding portions 191 and 192 are limited in their upward extension since if made to extend higher than shown in Figs. 11 and 12 they would obviously interfere with and engage the complementary cup-carrying member which cooperates with the reamer 184. In Fig. 11, the upstanding portion 192 has almost reached its position wherein it just misses the cup-carrying member 19 and in Fig. 12 the upstanding portions 191 and 192 are shown in their position when the reamer is in full engagement with the fruit half A. At this time, it will be noted that the upstanding portions 191 and 192 cannot serve too much of a deflecting function and therefore other means are provided to cooperate with the upstanding portions 191 and 192 to deflect and confine juice splatter. The upstanding portions 191 and 192 do deflect juices when the reamer holder or carrier 180 is in the position shown in Fig. 11, and also when the reamer is on the point of terminating its reaming function.

The movable means comprise an oscillatory member 204 which substantially encircles the reamer head 184 as can best be seen in Fig. 14, and this oscillatory member is mounted by means of sleeves 206 and 207 on trunnions 208 and 209. Trunnion 208 is provided by the closure member 210 which is secured to a removable supporting plate 212 which is secured to U-shaped member 191 by screws 214. Trunnion 209 is provided by a bracket member 216 which is secured to the upper end of the holder or carrier 180 by screws 220 compare Figs. 13 and 14. There is a torsion spring 222 enclosed by cover member 210 and one end of the spring is secured to the cover member 210 and the other end to the oscillatory member 204, compare Figs. 12 and 14. Spring 222 serves to urge the oscillatory member in its clockwise position as viewed in Figs. 11 and 12 so that a left-hand end 225 of the oscillatory member 204 is in its uppermost position to serve a deflecting function when the reamer first engages the fruit half as can best be seen in Fig. 11. Side 225 is provided with a resilient lip-providing member 227 formed of neoprene or similar material inert to the action of fruit juice and this lip 227 assists in deflecting the juices and yet can be deformed by cup-providing member 19 during the reaming operation and relative rotation between cup-carrying member 19 and holder 180. Side 225 and the opposed side 230 of oscillatory member 204 are curved as best shown in Fig. 12 and preferably have their center of curvature at the pivotal axis of member 204.

The removable supporting plate 212 extends upwardly substantially as high as the reamer head 184 as can be seen in Fig. 13 and is located during the reaming operation adjacent one side of the cup-providing member 19 and therefore serves a deflecting purpose at all times during the reaming operation. It can be seen therefore that between deflecting members 212, 191, and 192 and movable deflecting member 204 and lip 227 that the splatter of juices produced by the engagement of the reamer head with a fruit half is materially confined and the removable supporting plate 212 definitely serves to prevent the juice from being splattered on the window 29 and member 212 in conjunction with the other members prevent the coating of fruit peels and therefore prevent waste of the fruit juice. There is a fruit juice drain or guide member 235 which has a raised central portion 237 and depressed side portions which terminate in gutters 239. The drain plate 235 is inclined toward the wall 16 as best seen in Fig. 13 so as to convey the juice rearwardly toward the wall 16. Drain plate 235 is secured to U-shaped supporting member 191 by means of ears 241 provided on the drain member 235 and by means of screws 243 receivable through the U-shaped supporting member 191.

Following the extraction of the juice from the fruit held in cup-carrying members 18 and 19 by the reamer assembly 22 and 23, members 18 and 19 continue through their circular path of travel resulting in bringing that portion of the fruit remaining in members 18 and 19 into contact with member 26. This member 26 forces the remaining portions of the fruit from the cup members 18 and 19 resulting in their falling on baffle plate 108 and in comminuter assembly 30.

Another novel part of the present invention is the construction of the reamer head 184. Reamer head 184 can be considered as being hollow and having a central boss 251 which is internally threaded to receive driven shaft 188. Reamer head 184 is provided with radial ribs 255 and between these radial ribs there are openings 256 permitting communication between the inside of the reamer and the outside of the reamer and therefore permitting juice to pass through the openings through the reamer and out the lower end of the reamer. This construction results in allowing the juices squeezed from the fruit halves to readily escape from the fruit halves. Applicant has discovered that some of the juices in the fruit halves is in effect trapped therein and is wasted because it cannot escape during the reaming operation. By providing the openings 256 the fruit halves are effectively supported by the reamer head 184 which is required and yet the juices within the fruit halves are allowed to flow freely through the reamer and be collected so that a maximum amount of juice is obtained from each fruit half.

The spring loaded gate 37 in addition to regulating the wetness of the pulp dispensed from the finisher also regulates the amount of pulp in the juice. This is so since a greater resistive force by the gate 37 allows and forces some of the pulp through the screen or strainer 41 so that when the pressure on gate 37 is increased the wetness of the pulp is decreased and the amount of pulp in the juice is increased. Therefore, the user can regulate the amount of pulp in the juice and the wetness of the juice as he desires.

It will be appreciated that the comminuter set out in the present invention has wide use in food processing in general apart from its use as a peel grinder or comminuter.

Various changes may be made in the details of construction without departing from the spirit and scope of the invention as defined by the appended claims.

I claim:

1. In a fruit juice extractor having a fruit juice finisher located therein comprising a unitary member providing a baffle plate and a pulp and juice hopper, means for removably supporting the unitary member in the lower part of the extractor, said member having a fruit and pulp conveying projection thereon, a housing on the extractor, a hollow, cylindrical screen removably received by said housing and having a pulp outlet in one end thereof, said screen having an opening constructed in one side thereof to receive the projection on said member to lock the screen against movement in said housing, an arcuately formed rotary blade arranged to traverse the interior of the screen and force pulp toward said outlet, and means on said extractor for closing said pulp outlet.

2. In a fruit juice extractor having a fruit juice finisher located therein comprising a unitary member providing a baffle plate and a pulp and juice hopper, means for removably supporting the unitary member in the lower part of the extractor, said member having a fruit and pulp conveying projection thereon, a housing on the extractor, a hollow, cylindrical screen removably received by said housing and having a pulp outlet in one end thereof, said screen having an opening constructed in one side thereof to receive the projection on said member to lock the screen against movement in said housing, an arcuately formed rotary blade arranged to traverse the interior of the screen and force pulp toward said outlet, said blade having a circumferentially projecting portion thereon that is adjacent the opening in said screen for positively removing the pulp disposed in the projection of said member thereby preventing backing up of the pulp in the member, and means on said extractor for closing said pulp outlet.

References Cited in the file of this patent

UNITED STATES PATENTS

| Number | Name | Date |
|---|---|---|
| 489,723 | Titus | Jan. 10, 1893 |
| 1,214,134 | Cheney | Jan. 30, 1917 |
| 1,254,008 | Heishman | Jan. 15, 1918 |
| 1,473,776 | Levin | Nov. 13, 1923 |
| 1,582,156 | Baum | Apr. 27, 1926 |
| 1,734,534 | Shields | Nov. 5, 1929 |
| 1,871,536 | Le Bus | Aug. 16, 1932 |
| 1,881,908 | Papac | Oct. 11, 1932 |
| 1,902,738 | Tuttle | Mar. 21, 1933 |
| 2,035,619 | Robison | Mar. 31, 1936 |
| 2,065,271 | Faulds | Dec. 22, 1936 |
| 2,099,739 | Jenkins | Nov. 23, 1937 |
| 2,160,388 | Morse | May 30, 1939 |
| 2,195,879 | Urschel et al. | Apr. 2, 1940 |
| 2,274,306 | Smith | Feb. 24, 1942 |
| 2,285,756 | Schweighart | June 9, 1942 |
| 2,313,128 | Densten | Mar. 9, 1943 |
| 2,342,485 | Percifield, Jr. | Feb. 22, 1944 |
| 2,365,883 | Ketchum | Dec. 26, 1944 |
| 2,367,757 | Cutler | Jan. 23, 1945 |
| 2,440,425 | Williams | Apr. 27, 1948 |
| 2,474,368 | Rankenburg | June 28, 1949 |
| 2,517,520 | Wurgaft | Aug. 1, 1950 |
| 2,533,350 | Cahill | Dec. 12, 1950 |
| 2,540,500 | Waggoner | Feb. 6, 1951 |
| 2,622,644 | Smith | Dec. 23, 1952 |

FOREIGN PATENTS

| Number | Country | Date |
|---|---|---|
| 274,052 | Switzerland | June 1, 1951 |